US012789943B2

(12) United States Patent
Lin

(10) Patent No.: US 12,789,943 B2
(45) Date of Patent: Nov. 10, 2026

(54) DRIVING APPARATUS OF AN ELECTRICALLY ASSISTED BICYCLE

(71) Applicant: Enerstro Tech. Corp., Yunlin County (TW)

(72) Inventor: Po-Ju Lin, Taichung (TW)

(73) Assignee: ENERSTRO TECH. CORP., Yunlin County (TW)

(*) Notice: Subject to any disclaimer, the term of this patent is extended or adjusted under 35 U.S.C. 154(b) by 327 days.

(21) Appl. No.: 18/420,818

(22) Filed: Jan. 24, 2024

(65) Prior Publication Data

US 2025/0236354 A1 Jul. 24, 2025

(51) Int. Cl.
*B62M 6/55* (2010.01)
*B62M 11/14* (2006.01)

(52) U.S. Cl.
CPC ............ *B62M 6/55* (2013.01); *B62M 11/145* (2013.01)

(58) Field of Classification Search
CPC ............................... B62M 6/55; B62M 11/145
See application file for complete search history.

(56) References Cited

U.S. PATENT DOCUMENTS 7,749,121 B2 * 7/2010 Perng ........................ B62M 6/55 475/5
2015/0080163 A1 * 3/2015 Bang ...................... B62M 23/02 475/8

FOREIGN PATENT DOCUMENTS

CN 108128400 A * 6/2018 ............ B62M 11/14
CN 110040209 A * 7/2019 ............ B62M 11/14
GB 2146932 A * 5/1985 ............... F16H 1/46

* cited by examiner

*Primary Examiner* — George C Jin
(74) *Attorney, Agent, or Firm* — Bruce Stone LLP; Joseph A. Bruce

(57) ABSTRACT

An electrically assisted bicycle is provided with a driving apparatus comprising a motor, an epicyclic gearing, an annular supporting element and two shafts. The epicyclic gearing includes a reduced sun gear supported on a reduced section of the tubular mandrel of the motor. The annular supporting element is connected to a chain ring. The left shaft extends throughout the tubular mandrel and includes a left end connected to a crank, a right end, and a reduced section extending throughout the reduced section of the tubular mandrel. The right end is slenderer than the left end. The right shaft includes a right end connected to another crank and a left end connected to the right end of the left shaft so that they are rotatable together. A clutch is arranged between the epicyclic gearing and the annular supporting element. Another clutch is arranged between the right shaft and the epicyclic gearing.

2 Claims, 7 Drawing Sheets

DRIVING APPARATUS OF AN ELECTRICALLY ASSISTED BICYCLE

BACKGROUND OF INVENTION

1. Field of Invention

The present invention relates to an electrically assisted bicycle and, more particularly, to a driving apparatus of an electrically assisted bicycle

2. Related Prior Art

An electrically assisted bicycle includes a driving apparatus including a motor, an epicyclic gearing (or "planetary gear set"), two clutches, an annular supporting element and crank shaft unit. The motor is located in a bottom bracket of the electrically assisted bicycle. The motor includes a tubular mandrel. The epicyclic gearing includes a sun gear supported on the tubular mandrel. The crank shaft unit includes a shaft (or "axle") and two cranks. The shaft extends throughout the tubular mandrel. However, the shaft is not connected to the mandrel, i.e., they are allowed to rotate relative to each other. The first clutch is arranged between the tubular mandrel and the annular supporting element. The second clutch is arranged between the annular supporting element and the shaft. The annular supporting element is connected to at least one chain ring (or "sprocket"). The chain is connected to at least one fly wheel via a chain. The fly wheel is connected to a rear wheel of the electrically assisted bicycle.

A simplified equation for a reduction ratio of the epicyclic gearing is the number of the teeth of a ring gear divided by the number of the teeth of the sun gear plus one ("1"). When the number of the teeth of the ring gear is fixed, the reduction ratio is determined by the number of the teeth of the sun gear.

As discussed above, the shaft extends throughout the tubular mandrel, and the tubular mandrel supports the sun gear. The diameter of the shaft determines the internal diameter of the tubular mandrel. The external diameter of the tubular mandrel determines internal and external diameters of the sun gear, i.e., the number of the teeth of the sun gear. For connection to the cranks, the shaft is made with a constant diameter throughout its length. Hence, the number of the teeth of the sun gear is fixed, and so is the reduction ratio unless the ring gear is made bigger which is however not desirable.

The present invention is therefore intended to obviate or at least alleviate the problems encountered in the prior art.

SUMMARY OF INVENTION

It is the primary objective of the present invention to provide an electrically assisted bicycle with a driving apparatus that provides an adequate reduction ratio.

To achieve the foregoing objective, the driving apparatus includes a motor, an epicyclic gearing, an annular supporting element and two shafts. The epicyclic gearing includes a reduced sun gear supported on a reduced section of the tubular mandrel of the motor. The annular supporting element is connected to a chain ring. The left shaft extends throughout the tubular mandrel and includes a left end connected to a crank, a right end, and a reduced section extending throughout the reduced section of the tubular mandrel. The right end is slenderer than the left end. The right shaft includes a right end connected to another crank and a left end connected to the right end of the left shaft so that they are rotatable together. A clutch is arranged between the epicyclic gearing and the annular supporting element. Another clutch is arranged between the right shaft and the epicyclic gearing.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
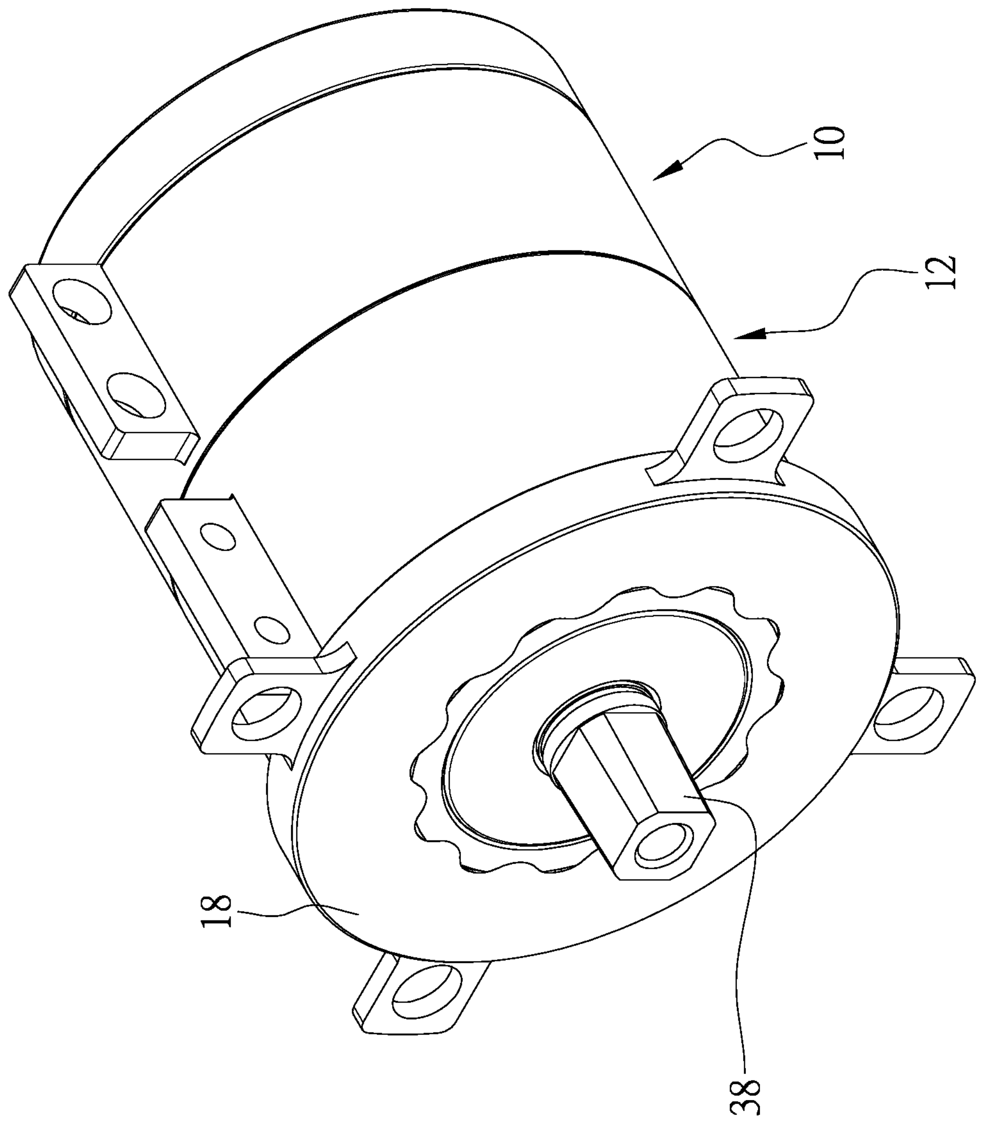
FIG. 1 is a perspective view of a driving apparatus for an electrically assisted bicycle according to the preferred embodiment of the present invention.
Figure 2:
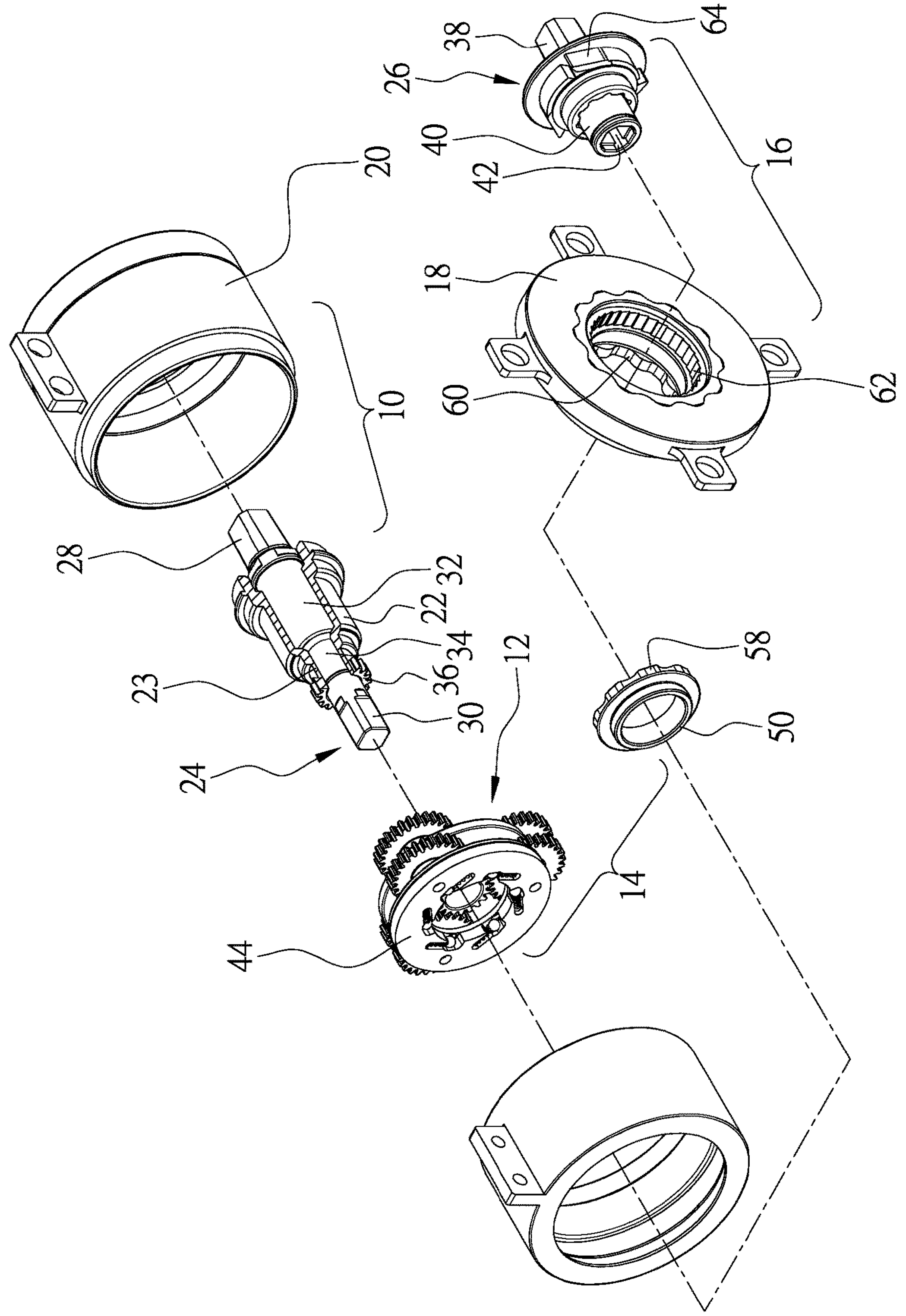
FIG. 2 is an exploded view of the driving apparatus shown in FIG. 1.
Figure 3:
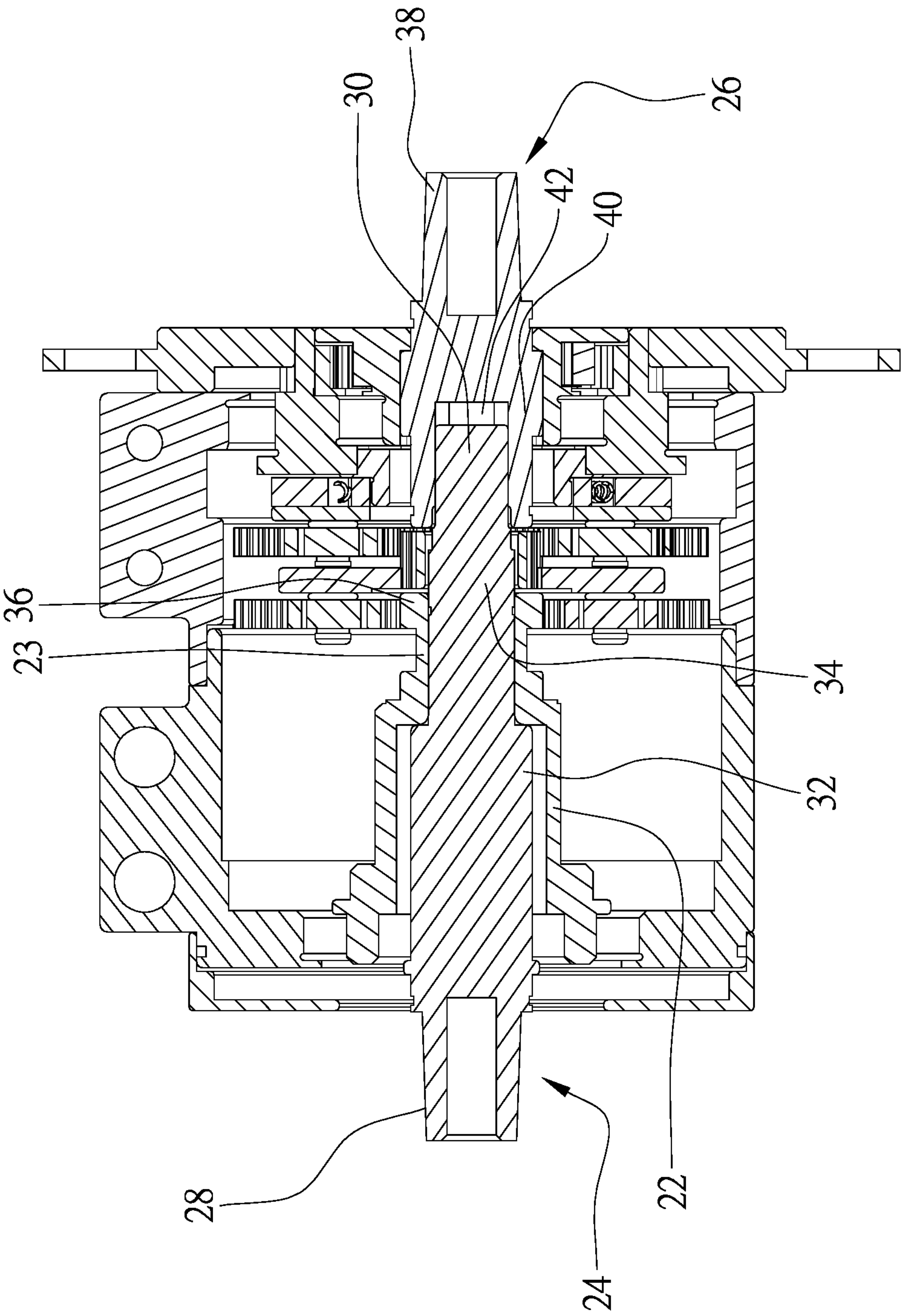
FIG. 3 is a cross-sectional view of the driving apparatus depicted in FIG. 1.

Referring to FIGS. 1 through 3, a driving apparatus of an electrically assisted bicycle includes a motor 10, an epicyclic gearing 12, two clutches 14 and 16, an annular supporting element 18 and a crank shaft unit according to the preferred embodiment of the present invention. The motor 10 is located in a bottom bracket of the electrically assisted bicycle. The motor 10 includes a shell 20, a tubular mandrel 22, magnets (not shown) and coils (not shown). The shell 20 contains the tubular mandrel 22, the magnets and the coils. The magnets are connected to the tubular mandrel 22. Notably, the tubular mandrel 22 includes a reduced section 23. The term "reduced" is given with respect to the diameter.

The epicyclic gearing 12 includes a sun gear 36 supported on the reduced section 23 of the tubular mandrel 22.

The crank shaft unit includes a left shaft 24 and a right shaft 26, a left crank (not shown) and a right crank (not shown). The left shaft 24 extends throughout the tubular mandrel 22. However, the left shaft 24 is not connected to the tubular mandrel 22, i.e., they are allowed to rotate relative to each other. The clutch 14 is arranged between the tubular mandrel 22 and the annular supporting element 18. The clutch 16 is arranged between the annular supporting element 18 and the right shaft 26. The annular supporting element 18 is connected to at least one chain ring (not shown). The chain ring is connected to at least one fly wheel (not shown) via a chain (not shown). The fly wheel is connected to a rear wheel (not shown) of the electrically assisted bicycle.

The left shaft 24 includes a left end 28, a right end 30, standard section 32 and a reduced section 34. The standard section 32 is located in adjacence of the left end 28. The left end 28 and the right end 30 are both square sections. In use, the left end 28 is located in a square bore of the left crank. The reduced section 34 is located in adjacence of the right end 30. The standard section 32 is located next to the reduced section 34. The standard section 32 is made with a diameter identical to that of a typical shaft of a typical crankshaft unit. The reduced section 34 is made with a diameter smaller than that of the typical shaft of the typical crankshaft unit.

The reduced section 34 of the left shaft 24 extends throughout the reduced section 23 of the tubular mandrel 22. The reduced section 34 of the left shaft 24 and the reduced section 23 of the tubular mandrel 22 allows the sun gear 36 to be made with internal and external diameters smaller than that of a sun gear of an epicyclic gearing of a typical driving apparatus of an electrically assisted bicycle. Hence, the epicyclic gearing 12 provides better ratio rate than the epicyclic gearing of the typical driving assembly.

The right shaft 26 includes a right end 38 and a left end 40. In use, the right end 38 is located in a square bore of the right crank. The left end 40 of the right shaft 26 is made with a square bore 42 for receiving the right end 30 of the left shaft 24. Hence, the right shaft 26 and the left shaft 24 are not rotatable relative to each other, i.e., they are only rotatable together with each other.

Figure 6:
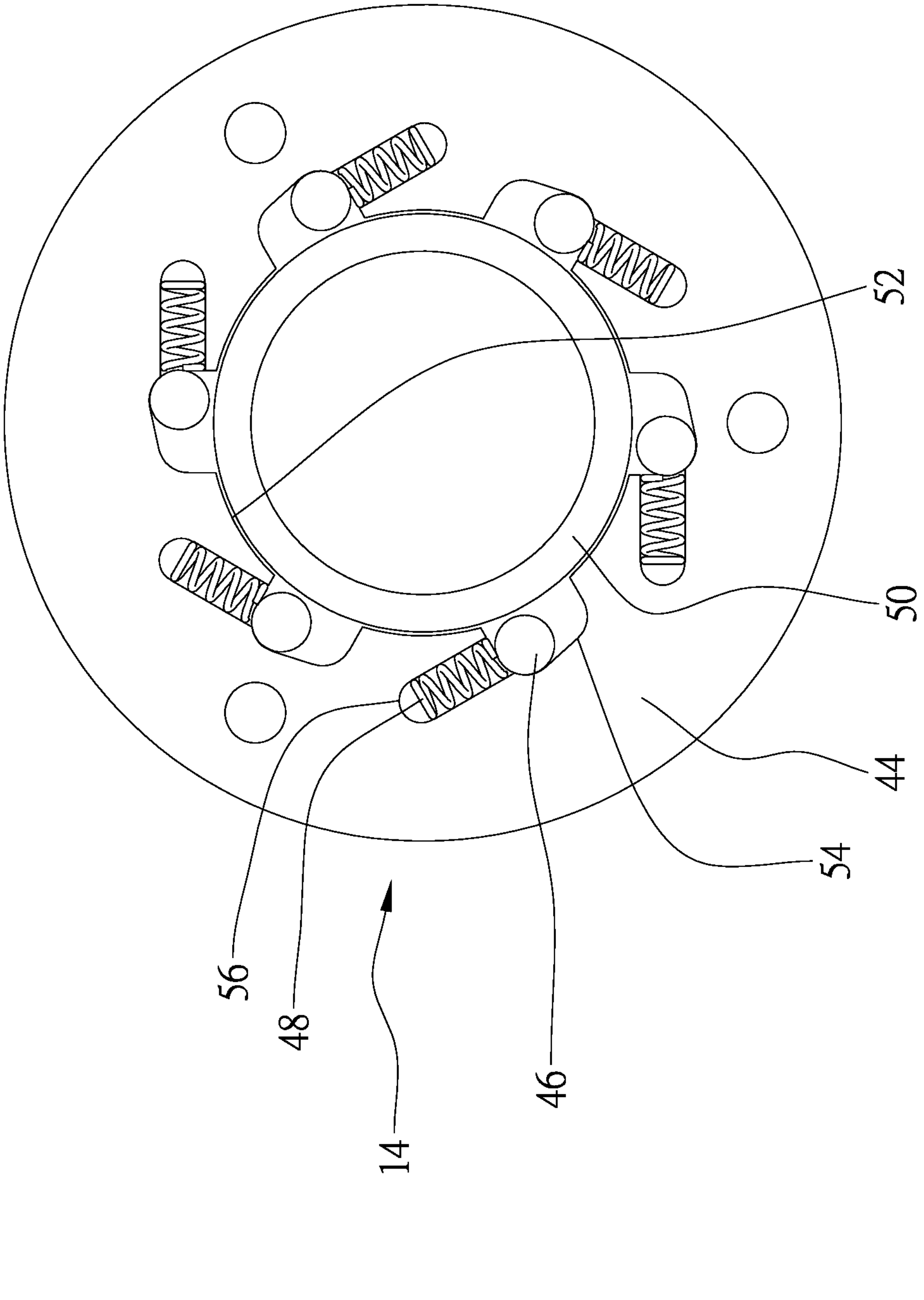
FIG. 6 is a front view of a second clutch of the driving apparatus depicted in FIG. 1 in a releasing position.

Referring to FIGS. 2, 3 and 6, the clutches 14 consists of a carrier 44 of the epicyclic gearing 12, balls 46, springs 48 and a ring 50. The carrier 44 includes a central aperture 52, grooves 54 and pockets 56. The central aperture 52 is in communication with each other the pockets 56 via a corresponding one of the grooves 54. Each of the grooves 54 expands as it extends toward the corresponding pocket 56 from the central aperture 52. The central aperture 52 receives the ring 50. Each of the grooves 54 receives a corresponding one of the balls 46. Each of the pockets 56 receives a corresponding one of the springs 48. Each of the balls 46 is biased by a corresponding one of the springs 48.

There is a non-circular portion 58 formed on the right-hand side of the ring 50. There is a non-circular hole 60 in the left-hand side of the annular supporting element 18. The non-circular hole 60 receives the non-circular portion 58. Thus, the ring 50 is not rotatable relative to the annular supporting element 18, i.e., they are only rotatable together with each other. In another embodiment, the ring 50 and the annular supporting element 18 are made in one piece.

Figure 4:
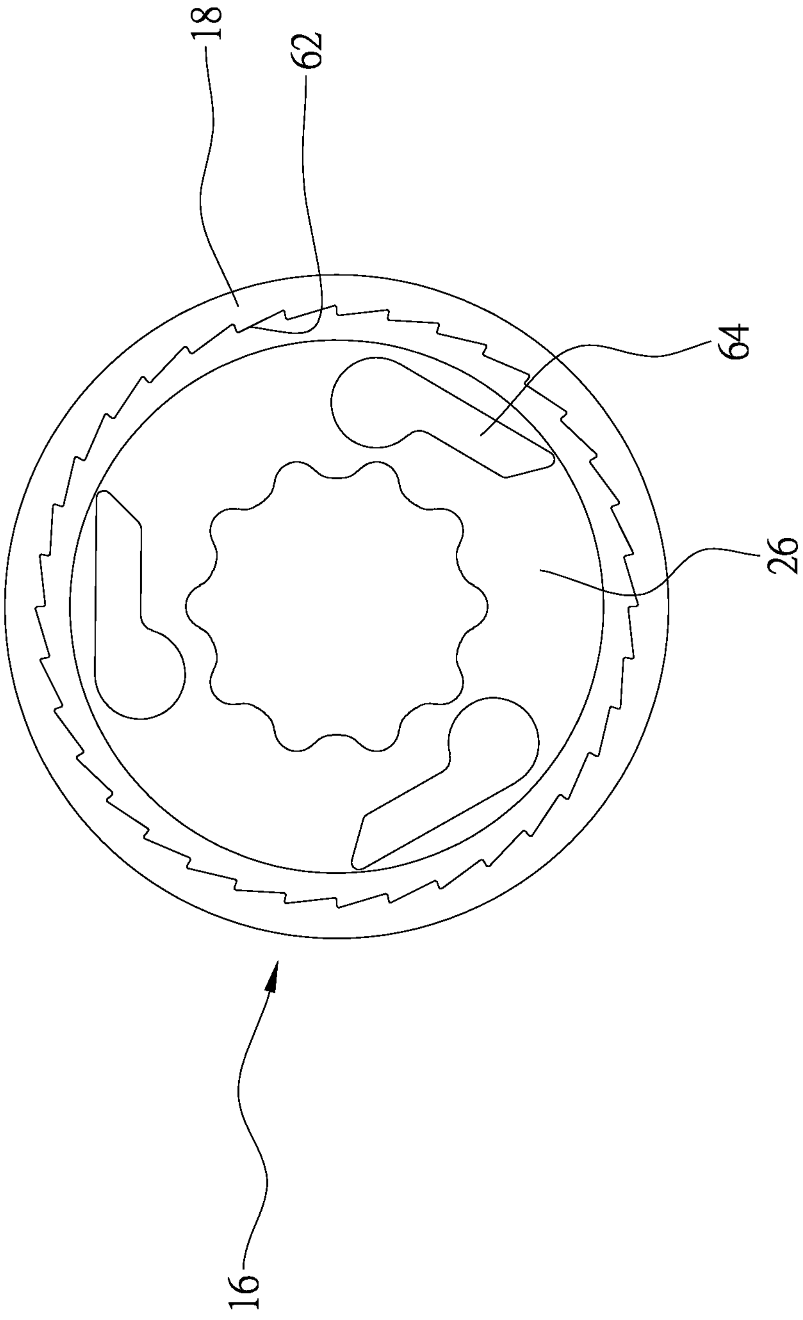
FIG. 4 is a front view of a first clutch of the driving apparatus depicted in FIG. 1 in a releasing position.

Referring to FIGS. 2 and 4, the clutch 16 consists of teeth 62 and detents 64. The teeth 62 are formed on an internal face of the annular supporting element 18. The detents 64 are pivotally connected to the right shaft 26 so that the former elastically extend from the latter. Each of the detents 64 is operable to engage with the teeth 62.

In an idle position, each of the clutches 14 and 16 is in a releasing position (FIGS. 4 and 6).

Figure 5:
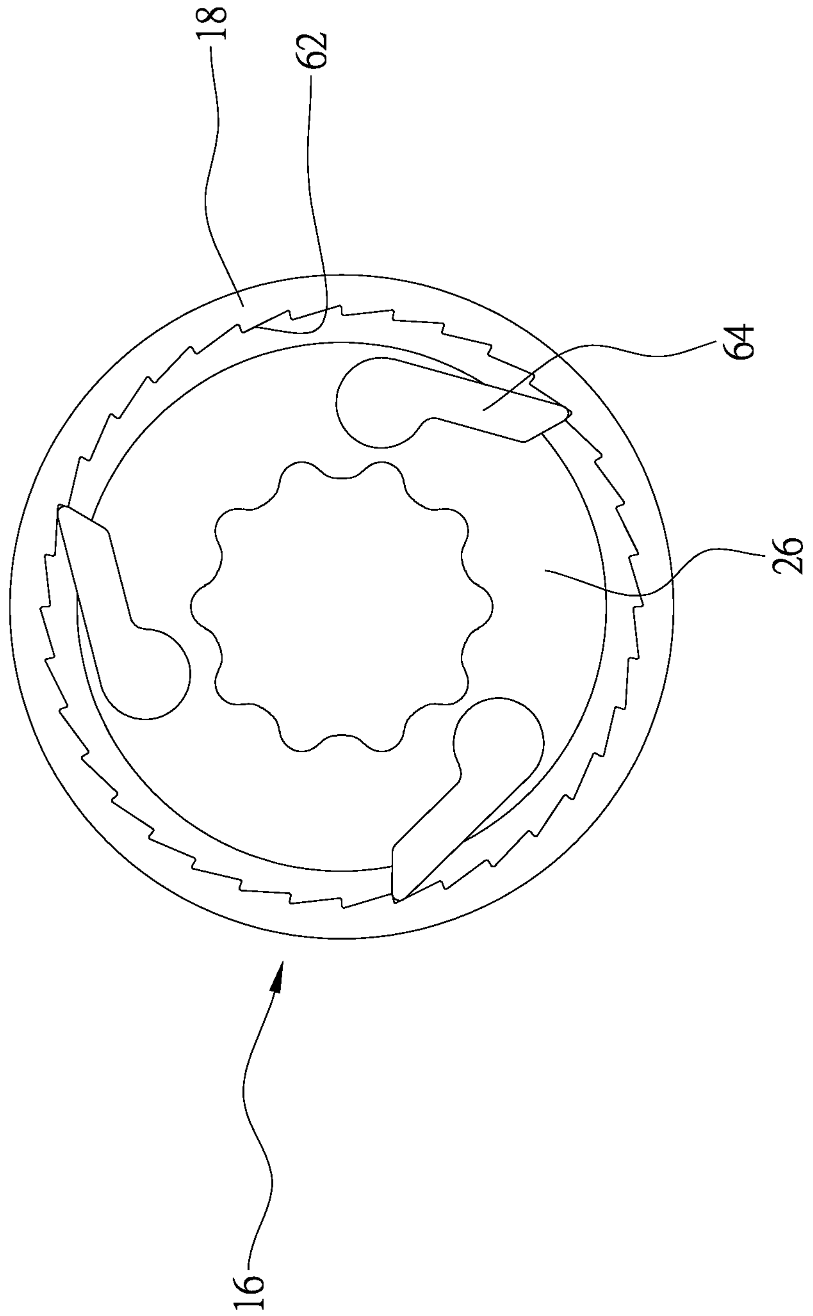
FIG. 5 is a front view of the first clutch in a clutching position.

When only manual driving is used, the clutches 16 is in a clutching position (FIG. 5), and the clutch 14 is in the releasing position (FIG. 6).

When only electric driving is used, the clutch 14 is in a clutching position (FIG. 7), and the clutch 16 is in the releasing position (FIG. 4).

Figure 7:
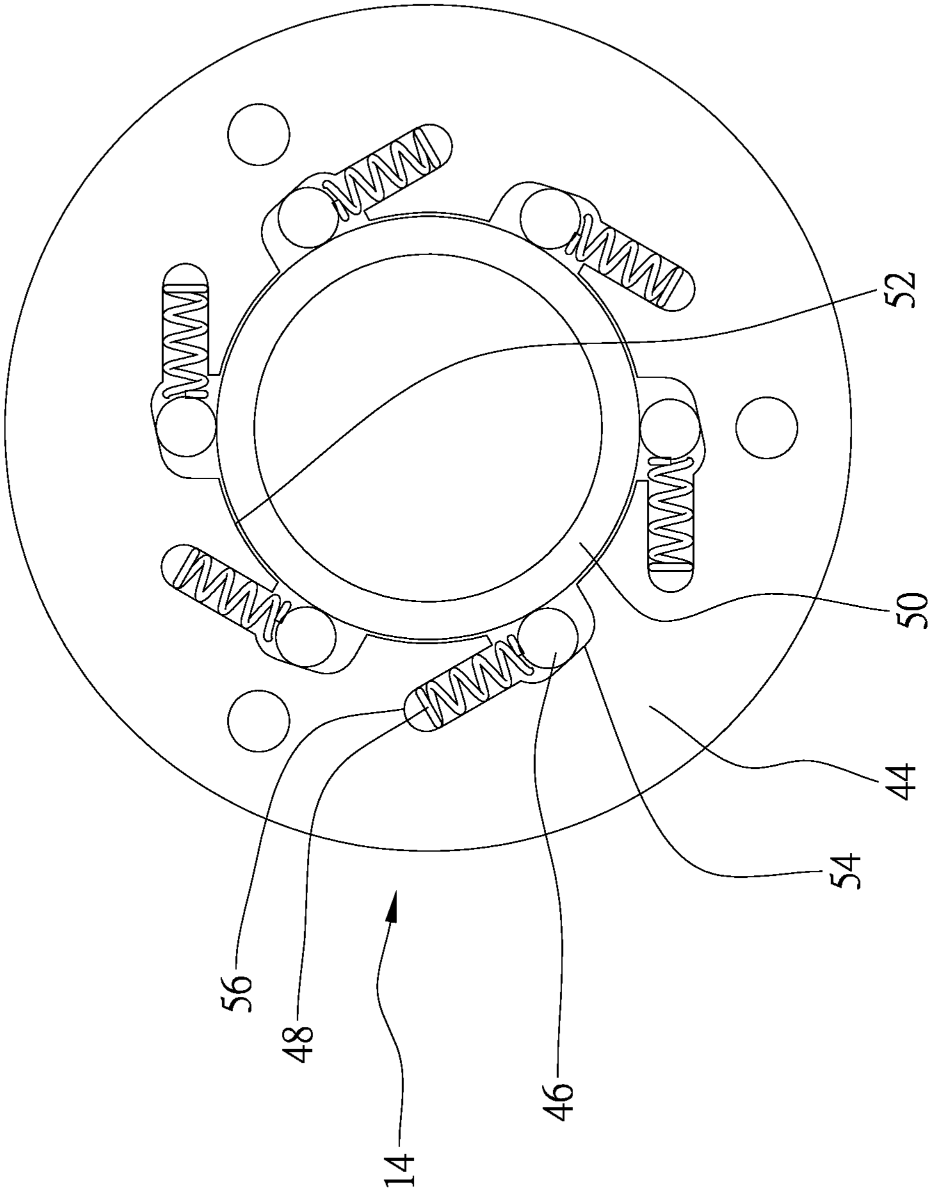
FIG. 7 is a front view of the second clutch in a clutching position.

When manual driving and electric driving are both used, the clutch 16 is in the clutching position (FIG. 5), and the clutch 14 is in the clutching position (FIG. 7).

The clutches 14 and 16 will not be further described in detail for being conventional.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A driving apparatus for an electrically assisted bicycle comprising:

a motor located in a bottom bracket of the electrically assisted bicycle, wherein the motor comprising a tubular mandrel formed with a reduced section;

an epicyclic gearing comprising a reduced sun gear supported on the reduced section of the tubular mandrel;

an annular supporting element connected to at least one chain ring of the electrically assisted bicycle;

a left shaft extending throughout the tubular mandrel and comprising a left end connected to a crank of the electrically assisted bicycle, a right end, and a reduced section extending throughout the reduced section of the tubular mandrel, wherein the right end is slenderer than the left end;

a right shaft comprising a right end connected to another crank of the electrically assisted bicycle and a left end connected to the right end of the left shaft so that the left and right shafts are not rotatable relative to each other;

a first clutch arranged between the epicyclic gearing and the annular supporting element; and a second clutch arranged between the right shaft and the epicyclic gearing.

2. The driving apparatus according to claim 1, wherein the right end of the left shaft is a square, wherein the right shaft comprises a left end formed with a square bore for receiving the right end of the left shaft.

* * * * *